(12) United States Patent
Urata et al.

(10) Patent No.: US 10,179,619 B1
(45) Date of Patent: Jan. 15, 2019

(54) ROBOTIC FOOT SENSOR

(71) Applicant: Schaft Inc., Tokyo (JP)

(72) Inventors: Junichi Urata, Tokyo (JP); Masaki Hamafuji, Tokyo (JP)

(73) Assignee: Schaft Inc., Tokyo (JP)

( * ) Notice: Subject to any disclaimer, the term of this patent is extended or adjusted under 35 U.S.C. 154(b) by 128 days.

(21) Appl. No.: 15/085,584

(22) Filed: Mar. 30, 2016

(51) Int. Cl.
  *B62D 57/032* (2006.01)
  *B25J 13/08* (2006.01)
  *B25J 9/16* (2006.01)

(52) U.S. Cl.
  CPC ............ *B62D 57/032* (2013.01); *B25J 9/162* (2013.01); *B25J 13/085* (2013.01); *Y10S 901/01* (2013.01); *Y10S 901/46* (2013.01)

(58) Field of Classification Search
  CPC ....... B62D 57/032; B25J 13/085; B25J 9/162; Y10S 901/01; Y10S 901/46
  See application file for complete search history.

(56) References Cited

U.S. PATENT DOCUMENTS

| | | | |
|---|---|---|---|
| 4,821,584 A | | 4/1989 | Lembke |
| 5,775,750 A | | 7/1998 | Gauci et al. |
| 7,061,200 B2 | | 6/2006 | Iribe |
| 9,352,470 B1 | * | 5/2016 | da Silva ................ B25J 13/088 |
| 9,387,588 B1 | * | 7/2016 | Blankespoor .......... B62D 57/00 |
| 9,387,896 B1 | * | 7/2016 | Blankespoor ........ B62D 57/032 |
| 9,446,518 B1 | * | 9/2016 | Blankespoor .......... B25J 9/1676 |
| 9,618,937 B1 | * | 4/2017 | Blankespoor .......... G05D 1/021 |
| 2003/0125839 A1 | * | 7/2003 | Takenaka ............... B62D 57/02 700/245 |
| 2004/0051493 A1 | * | 3/2004 | Furuta .................. B62D 57/032 318/568.12 |
| 2005/0120820 A1 | * | 6/2005 | Takenaka ............. B25J 19/0091 74/490 |
| 2005/0126833 A1 | * | 6/2005 | Takenaka ............... B25J 13/088 180/8.1 |
| 2005/0151496 A1 | * | 7/2005 | Furuta .................... B62D 57/02 318/568.12 |
| 2009/0200090 A1 | * | 8/2009 | Takanishi ............... B25J 13/085 180/8.6 |
| 2010/0126785 A1 | * | 5/2010 | Shimada .............. B62D 57/032 180/8.1 |
| 2011/0098857 A1 | * | 4/2011 | Yoshiike .............. B62D 57/032 700/246 |

(Continued)

OTHER PUBLICATIONS

Tadayoshi Aoyama, Taisuke Kobayashi, Zhiguo Lu, Kosuke Sekiyama, Yasuhisa Hasegawa, Toshio Fukuda, Locomotion Transition Scheme of Multi-Locomotion Robot, 2012, 16 pages, Japan.

*Primary Examiner* — Jelani A Smith
*Assistant Examiner* — Majdi Alsomiri
(74) *Attorney, Agent, or Firm* — Honigman Miller Schwartz and Cohn LLP

(57) ABSTRACT

An example implementation may involve receiving, by a robot comprising a first foot and a second foot, sensor data indicating that a force has been applied to a top surface of the first foot. The robot may have a trajectory, and the sensor data may be received from a sensor positioned on the top surface of the first foot. In response to receiving the sensor data, the robot may determine an updated trajectory for the robot and cause the second foot to swing such that the robot moves according to the updated trajectory.

16 Claims, 6 Drawing Sheets

(56) References Cited

U.S. PATENT DOCUMENTS

| | | | |
|---|---|---|---|
| 2013/0144437 A1* | 6/2013 | Lee | G01L 5/161 |
| | | | 700/258 |
| 2014/0172168 A1* | 6/2014 | Lee | B25J 13/08 |
| | | | 700/260 |
| 2015/0217447 A1* | 8/2015 | Kamioka | B25J 9/10 |
| | | | 700/245 |

* cited by examiner

US 10,179,619 B1

ROBOTIC FOOT SENSOR

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, the desire for efficient robotic systems becomes apparent. Therefore, a demand for efficient robotic systems has helped open up a field of innovation in actuators, movement, sensing techniques, as well as component design and assembly.

SUMMARY

The present disclosure generally relates to a sensor for a robotic foot that may detect when a robot has stepped on its own foot. Specifically, implementations described herein discuss a robotic foot sensor that may allow a robot to detect that it has stepped on its own foot and then adjust its gait accordingly, which may help to reduce the incidence of falling.

A first example implementation may include receiving, by a robot comprising a first foot and a second foot, sensor data indicating that a force has been applied to a top of the first foot, where the robot has a trajectory, and where the sensor data is received from a sensor positioned on the top of the first foot; in response to receiving the sensor data, determining an updated trajectory for the robot; and causing the second foot to swing such that the robot moves according to the updated trajectory.

A second example implementation may include a robot having a first foot that has a top; a second foot; a processor; a non-transitory computer readable medium; and program instructions stored on the non-transitory computer readable medium that, when executed by the processor, cause the robot to perform operations including: receiving, by the robot, sensor data indicating that a force has been applied to the top of the first foot, where the robot has a trajectory, and where the sensor data is received from a sensor positioned on the top of the first foot; in response to receiving the sensor data, determining an updated trajectory for the robot; and causing the second foot to swing such that the robot moves according to the updated trajectory.

A third example implementation of a robotic foot may include a top surface; and a sensor positioned on the top surface of the first foot, wherein the sensor is configured to detect a force applied to the top surface of the first foot.

A fourth example implementation may include a system having means for performing operations in accordance with the first example implementation.

These as well as other aspects, advantages, and alternatives will become apparent to those of ordinary skill in the art by reading the following detailed description, with reference where appropriate to the accompanying drawings.

DETAILED DESCRIPTION

Figure 1:
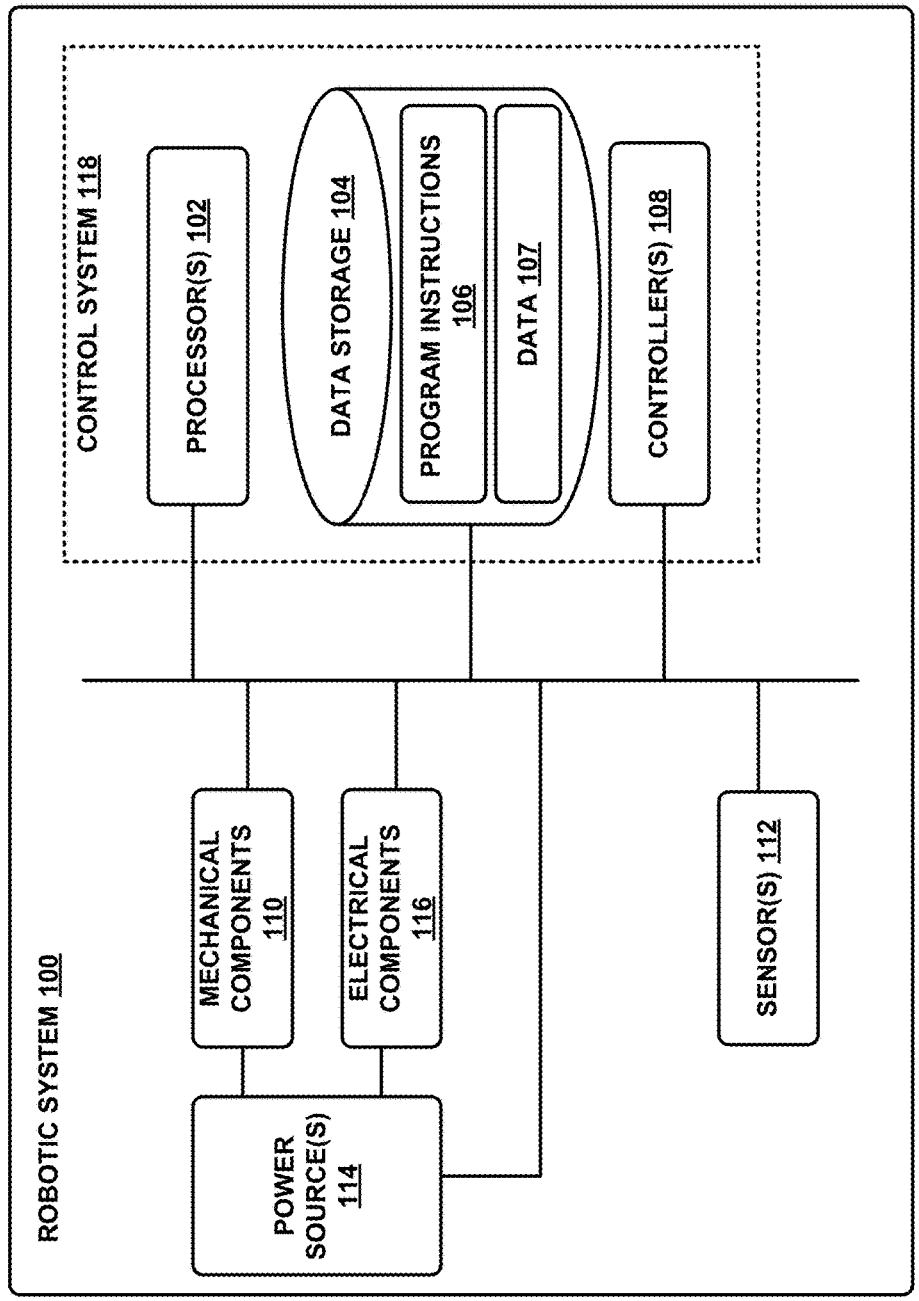
FIG. 1 illustrates a configuration of a robotic system, according to an example implementation.

Example implementations are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

I. Overview

Example implementations relate to a sensor for a robotic foot that may detect when a robot has stepped on its own foot. For instance, a robot may include a first foot and a second foot. The first foot may include a sensor positioned on a top of the foot. The sensor may be a pressure sensor or the like that is configured to detect when a force is applied to the top of the first foot. In some cases, the first foot may include a cover over its top, and the sensor may be positioned in between the cover and the top of the foot. In this way, the sensor may detect forces that are applied to the top of the first foot via the cover.

In an example implementation, the robot may be a biped robot, and may move on its feet in a walking gait. In the walking gait, the robot may have a trajectory. For instance, the trajectory may be a trajectory of the robot's zero moment point (ZMP). The trajectory of the ZMP point may be a target trajectory that was determined by the robot, for example. The walking gait may be characterized by alternating steps of the first and second foot of the robot. During its gait, the robot may encounter a disturbance that causes the second foot to make contact with the top of the first foot when the first foot is in contact with the ground surface (i.e., the first foot is in stance). The robot may then receive sensor data that a force has been applied to the top of the first foot.

Rather lifting the first foot to take the next step as might be typical of the robot's gait, the robot may, in response to receiving the sensor data, determine an updated trajectory for the ZMP. The robot may then cause the second foot, rather than the first foot, to swing such that the ZMP moves according to the updated trajectory. In this way, the robot may take two consecutive steps with the second foot—a first step that lands on the first foot due to the disturbance, and a second step to move the robot according to the updated trajectory.

Accordingly, the updated trajectory that is calculated in response to the received sensor data may include some constraints. First, the updated trajectory may be calculated assuming that the first foot remains in contact with the ground surface, at least until the second foot has completed its next step. Further, the robot may update the trajectory in a way that prioritizes some aspects of the robot's gait over others. For instance, the robot may determine an updated ZMP trajectory that deprioritizes a desired forward velocity, footstep timing, or footstep location in favor of correcting the gait disturbance and thus reducing the risk of falling down. In some cases, the robot may enter a "recovery mode" that modifies its previous gait until the robot is no longer at risk of falling over. For example, the robot may determine a ZMP trajectory that causes it to take a series of small, relatively quick steps to regain its balance. Other possibilities also exist.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
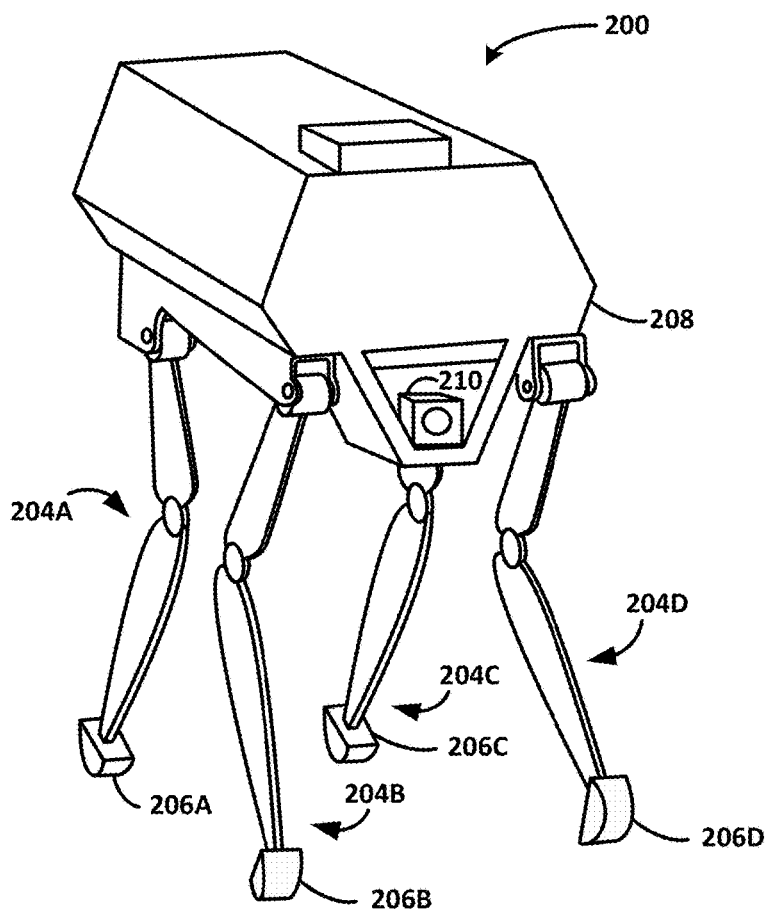
FIG. 2 illustrates a quadruped robot, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
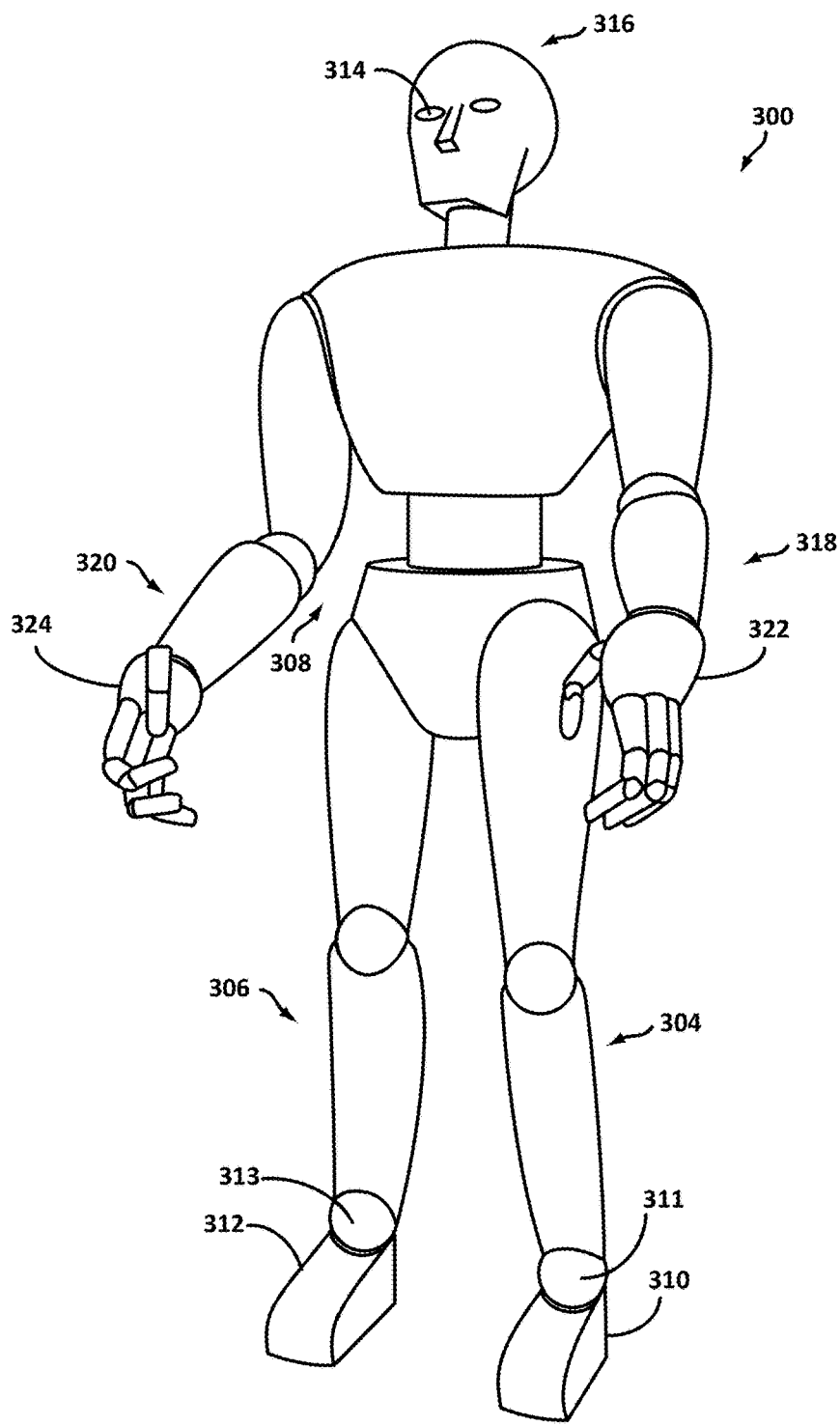
FIG. 3 illustrates a biped robot, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316. Some sensors may also be located in association with joints of robot 300, such as the force/torque sensors 311, 313 located near the robot's ankle joints. These sensors may provide the robot 300 with data regarding the reaction forces acting on the robot's feet 310, 312. Other examples are also possible.

III. Example Implementations

Example implementations are discussed below involving a sensor for a robotic foot that may detect when a robot has stepped on its own foot. The term "ground surface" as used herein is meant to encompass any possible surface or terrain that the robot may encounter, and is not meant to be limiting. For instance, the surface may be indoors or outdoors, may be rigid or loose, such as sand or gravel, and may include discontinuities or irregularities such as stairs, platforms, rocks, fallen trees, debris, and the like. Numerous other examples exist.

A. Example Implementations of a Robotic Foot Sensor

The following paragraphs generally discuss examples involving a biped robot with two feet, however the examples may also be applicable to robots with more feet, such as a quadruped robot with four feet, among others. Further, the implementations discussed below involve examples where a robot is walking in a forward-moving gait. However, other gaits are also possible. For example, the implementations herein may apply to backwards moving or sideways moving gaits as well.

Figure 4:
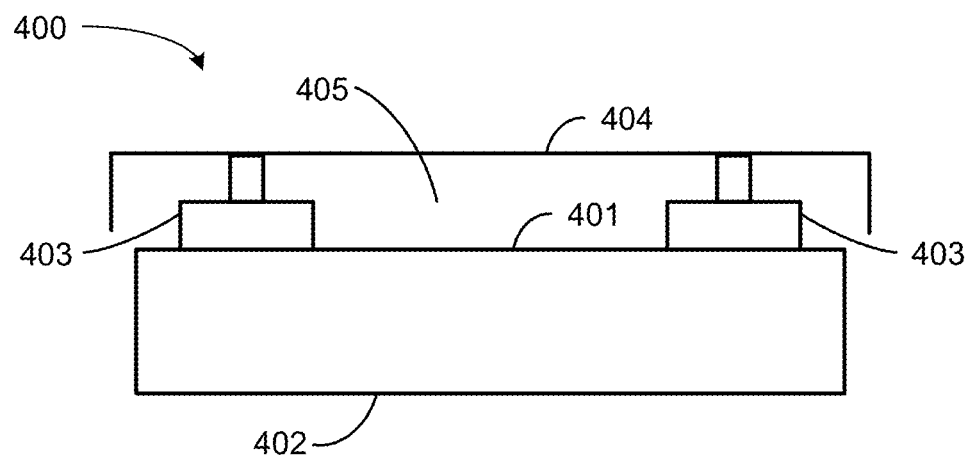
FIG. 4 illustrates a robotic foot, according to an example implementation.

FIG. 4 shows a robotic foot 400 that includes a robotic foot sensor according to an example implementation. The robotic foot sensor may be included on a robot, such as the robot 300 shown in FIG. 3, for example. The foot 400 shown in FIG. 4 may correspond to the robot's left foot 310. The foot 400 includes a top surface 401, as well as a bottom surface 402 that may generally contact a ground surface as the robot 300 stands and walks. Positioned on the top surface 401 of the foot 400 is a sensor 403 that is configured to detect a force applied to the top surface 401. In some cases, the sensor 403 may include a single sensor positioned on the top surface 401. The single sensor may have a shape, such as a ring shape, that allows it to detect forces applied to multiple different locations on the top surface 401. In other examples, such as the one shown in FIG. 4, the sensor 403 may be part of an array of sensors, the sensors positioned at different locations on the top surface 401 to detect forces at different locations.

In some implementations, the foot 400 may include a cover 404 that covers the top surface 401 of the foot 400 and is attached to the sensor 403. This configuration may allow one or more sensors 403 to detect forces that are applied anywhere on the top surface 401, via the cover 404. Further, the cover 404 may be separated from the top surface 401 by a gap 405 in some examples, and the sensor 403 may be positioned within the gap 405. The foot 400 of the robot 300 may include other features in addition to those shown in FIG. 4. For instance, the top surface 401 may include an ankle joint connection to a leg of the robot, such as the left leg 304. This joint connection may include additional sensors, such as a force/torque sensor 311 shown in FIG. 3, that may be used to determine ground reaction forces acting on the foot 400.

The sensor 403 may take numerous forms. In FIG. 4, the sensor 403 is depicted as pressure sensor in the form of a switch. The sensor may also include a load cell including one or more strain gauges, a piezoresistive force sensor, or any similar sensor that can directly or indirectly detect the application of a force. Some sensors may positioned between the top surface 401 and the cover 404 without the gap 405, such that the top surface 401 and the cover 404 are abutting. Multiple other configurations are possible.

In some situations, the force/torque sensor 311 located in the ankle of the robot 300 may be capable of detecting a force that is applied to the top surface 401 of the foot 400. For example, if the left foot 400 is swinging forward during a step and makes contact with an obstacle, such as the right leg 306 of the robot 300, the force/torque sensor 311 may detect the impact force. However, in other situations, the force/torque sensor 311 might not detect a force that is applied to the top surface 401 of the foot. For example, when the foot 400 is in contact with a ground surface, the sensor 311 might not detect a force that is applied to the top surface 401. Instead, the force may be directly opposed by the ground surface, and might not have any effect on the force torque/sensor in the robot's ankle.

This situation, where a force is applied to a robot's foot while the foot is in contact with the ground surface, may correspond to the robot 300 stepping on its own foot. For instance, the robot 300 in an example walking gait may encounter a disturbance, such as a collision with an obstacle, irregularities in the terrain, or a slip of its foot 400, etc., that may cause the robot's second foot to deviate from its typical swing pattern and touch down on top of the first foot 400. This can cause balance problems and cause the robot to fall, particularly if the robot 300 attempts to lift the stepped-on foot 400 in order to correct the disturbance and regain its balance.

Consequently, the sensor 403 allows the robot to detect and react to stepping on its own foot 400. A typical force/torque sensor 311 located, for instance, in the robot's ankle may eventually detect that the foot 400 has been stepped on. However, this detection might not occur until after the robot 300 starts to lift the foot 400 and the force/torque sensor 311 detects the downward force, opposing the lift. This may amplify the gait disturbance that the robot 300 has already experienced, resulting in the robot falling down. Therefore, it may be beneficial for the robot 300 to detect and react to stepping on its own foot 400 before it starts to lift the foot 400 that has been stepped on. This may allow the robot 300 to react more quickly and efficiently.

The robot 300 may have other sensors that inform whether the robot 300 has stepped on its own foot, in conjunction with the sensor 403. For instance, the robot 300 may use the position sensors in its joints to determine, via kinematics, the relative locations of its feet to one another. However, determining the position of the robot's feet via kinematics may be based on the accuracy of the robot's last calibration, and any sensor drift that has occurred since that time. Further, a situation in which the robot 300 steps on its own foot 400 may involve a fairly significant disturbance, which may introduce errors into the robot's kinematic determination of the position of its links and joints. Nonetheless, the robot 300 may use kinematic sensors and link positions in conjunction with the sensor 403 to determine that the robot 300 has stepped on its own foot. For example, if the sensor 403 detects a force applied to the top surface 401 of the foot 400, the robot 300 may determine the position of the second foot relative to the first foot 400 via kinematics, and thereby determine whether the force was likely applied by the second foot.

In some situations, the sensor 403 may detect a force that is applied to the top surface 401 of the foot 400 by something other than the robot's second foot. For example, an object may fall onto the robot's foot 400, or the robot's foot 400 may be stepped on by another robot in a crowded area, among other possibilities. Because the robot's kinematic sensors may provide inconclusive data regarding relative foot positions in some situations, the robot 300 may additionally include proximity sensors in its feet to determine if the force detected by the sensor 401 was applied by the second foot. For example, the sensor 403, or an additional sensor positioned on the first foot 400, may be configured to detect a proximity of a second sensor positioned on the second foot. Any type of known proximity sensor may be used.

For example, if the sensor 403 detects a force applied to the top surface 401 of the foot 400 and the proximity of the two feet is determined to be less than a threshold distance apart, e.g., 5 cm or 10 cm, the robot 300 may conclude that it has stepped on its own foot. In this way, the robot 300 may more reliably determine whether it has stepped on its own foot 400. This, in turn, may allow the robot 300 to determine an effective correction to its gait, and may allow the robot 300 to avoid falling down.

B. Example Implementations for Utilizing a Robotic Foot Sensor

Figure 5:
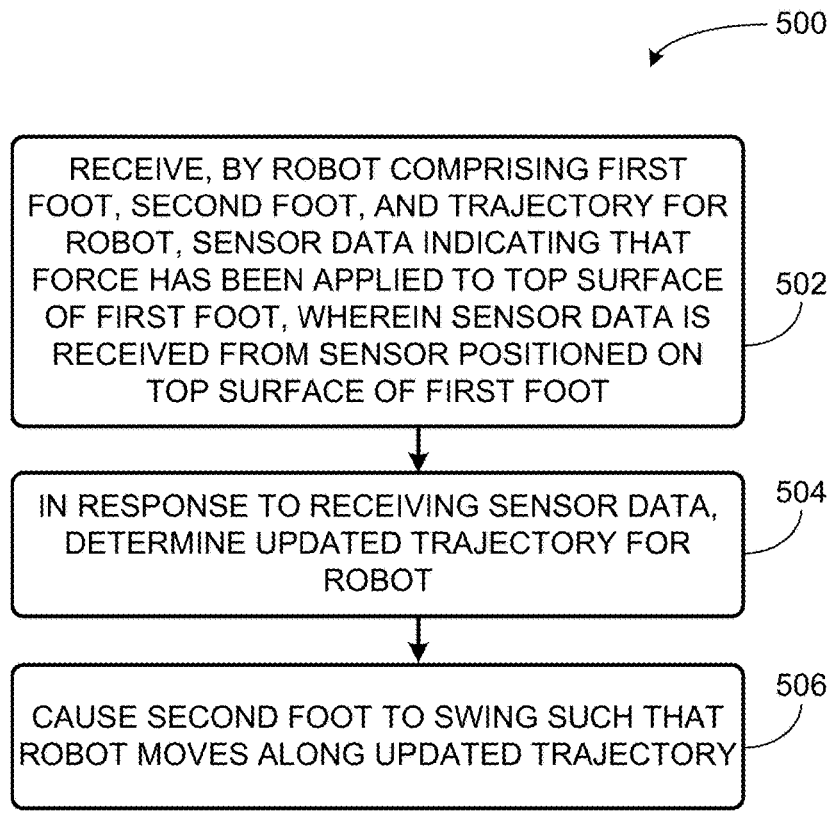
FIG. 5 is a flowchart, according to an example implementation.

Flow chart 500, shown in FIG. 5, presents example operations that may be implemented. Flow chart 500 may include one or more operations or actions as illustrated by one or more of the blocks shown in each figure. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

FIG. 5 is a flowchart 500 illustrating operations that a robot may undertake when it receives sensor data indicating that it has stepped on its own foot. For instance, the robot may be a biped robot, such as the robot 300 shown in FIG. 3. The robot 300 may include a first foot and a second foot, which may generally correspond to the feet 310 (i.e., the left foot) and 312 (i.e., the right foot) in FIG. 3. More specifically, the first foot 310 may be represented by the foot 400 shown in FIG. 4, including a sensor 403 positioned on a top surface 401 of the foot 400. For the purposes of the examples that follow, the first foot of the robot 300 will be referred to by reference to the foot 400 shown in FIG. 4.

Figure 6:
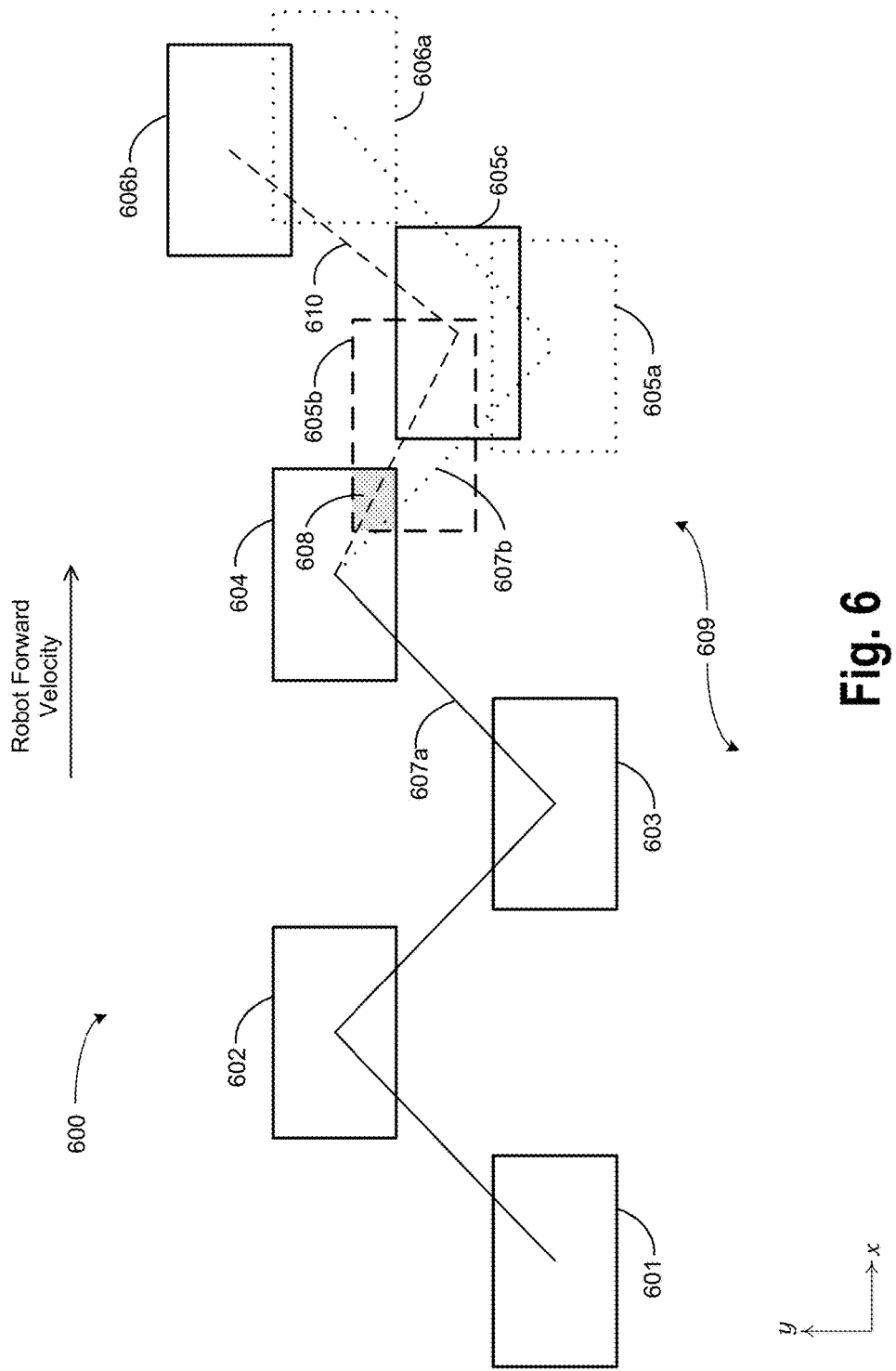
FIG. 6 illustrates a footstep pattern for a robot, according to an example implementation.

Further, the robot 300 may have a trajectory. For example, the robot 300 may move in a walking gait with a forward velocity. The robot's trajectory may include a trajectory for a ZMP of the robot 300. FIG. 6 shows an example footstep pattern 600 for the walking gait of the robot 300. Footstep locations 601, 602, 603, and 604 are shown, representing alternating footsteps of the robot's right foot 312 and left foot 400. The solid line 607a represents the trajectory of the robot's ZMP, shifting from foot to foot as the robot walks forward.

As discussed above, the robot 300 may experience a disturbance to its gait. The disturbance may result in the right foot 312 deviating from its planned ZMP trajectory, which is shown by the dotted line 607b in FIG. 6. Accordingly, the robot 300 might not place its right foot 312 at the next planned footstep location, 605a, also shown with a dotted line. Instead, the right foot 312 may touch down at the footstep location 605b, shown with a dashed line in FIG. 6. This results in the right foot 312 stepping on top of the left foot 400, as indicated by the shaded area 608.

Accordingly, at block 502 of the flowchart 500, the robot 300 may receive sensor data indicating that a force has been applied to the top surface 401 of the left foot 400. The sensor data may be received from a sensor, such as the sensor 403 shown in FIG. 4, that is positioned on the top surface 401 of the left foot 400, as discussed above.

The robot 300 may receive other sensor data as well. For example, the robot 300 may receive second sensor data indicating that the force has been applied to the top surface 401 of the left foot 400 by the bottom of the right foot 312. This may allow the robot 300 to distinguish between stepping on its own foot, and another object applying the force to the first foot 400, as discussed above. For instance, the robot 300 may receive the second sensor data from one or more kinematic sensors of the robot 300. Additionally or alternatively, the robot 300 may receive the second sensor data from one or more proximity sensors located in the robot's feet. Other examples are also possible.

As noted above, a force might be applied to the top surface 401 of the first foot 400 when the left foot 400 is in a swinging state, due to a collision with the right leg 306, for instance. Therefore, the robot 300 may also determine, before receiving the sensor data indicating the force applied to the top of the left foot 400, that the left foot 400 is in contact with a ground surface 609. For example, a force/torque sensor, such as the sensor 311 shown in FIG. 3, may detect a ground reaction force acting on the first foot 400, indicating that the left foot 400 is in contact with the ground surface 609. This may allow the robot 300 to determine that the force has been applied to the left foot 400 when it is in a stance state, and therefore may correspond to the robot 300 stepping on its own left foot 400.

As shown in FIG. 6, the next step for the left foot 400 was originally footstep location 606a, shown by a dotted line. However, once the left foot 400 has been stepped on, lifting the left foot 400 to step to footstep location 606a may compound the disturbance to the robot's gait, and ultimately cause the robot 300 to fall. Therefore, at block 504, in response to receiving the first sensor data indicating that a force has been applied to the top surface 401 of the left foot 400, the robot 300 may determine an updated trajectory for the robot 300. As noted above, the updated trajectory may be further based on the determination that the first foot 400 is in contact with the ground surface 609, and on a determination that the force was applied to the top of the left foot 400 by the right foot 312.

At block 506, the robot 300 may cause the right foot 312 to swing such that the robot 300 moves according to the updated trajectory 610. The updated trajectory may be, for instance, an updated ZMP trajectory 610, as shown by a dashed line 610 in FIG. 6. This may include a trajectory for a step of the right foot 312, wherein the left foot 400 remains in contact with the ground surface 609. Further, the updated trajectory 610 may include an updated foot step location 605c for the right foot 312, as shown in FIG. 6, followed by an updated footstep location 606b for the left foot 400. Other examples are also possible.

In this way, the robot may alter its gait by taking two consecutive steps with the right foot 312 before stepping with the left foot 400 again. For instance, before receiving the sensor data indicating the force has been applied to the left foot 400, the robot 300 may cause the left foot 400 to take a first step, represented by footstep location 604 in FIG. 6. After the first step, the robot 300 may cause the right foot 312 to take a second step. During the second step, the robot 300 may encounter the disturbance that causes the right foot 312 to touchdown at footstep location 605b on top of the left foot 400. After the second step, the robot 300 may receive the sensor data indicating the force, determine the updated trajectory, and then cause the right foot 312 to take a third step, to footstep location 605c. Finally, after the third step, the robot may cause the left foot 400 to take a fourth step, to updated foot step location 606b.

The updated trajectory may be determined based on a number of constraints. For example, before receiving the sensor data indicating the force has been applied to the left foot 400, the robot 300 may determine that the left foot is in contact with the ground surface 609, as noted above. When determining the updated trajectory, the robot 300 may assume a fixed position for the left foot 400 at footstep location 604, and may therefore refrain from lifting the left foot 400 until after causing the right foot 312 to lift and swing again.

Further, the robot 300 may determine an updated trajectory for the robot 300 that reduces the risk of falling down, perhaps at the expense of other desired gait parameters. For example, instead of trying to swing the right foot 312 back to the originally planned footstep location 605a, the robot 300 may determine the updated footstep location 605c, which is closer to the left foot 400. This may allow the robot 300 to step with its right foot 312 more quickly, which may be necessary to regain control after the disturbance. Further, the robot 300 may have a target forward velocity or a target heading, but may deprioritize these aspects of its gait in favor of finding a next footstep location for the right foot 312 that will mitigate the disturbance. Other possibilities also exist.

IV. Conclusion

While various implementations and aspects have been disclosed herein, other aspects and implementations will be apparent to those skilled in the art. The various implementations and aspects disclosed herein are for purposes of illustration and are not intended to be limiting, with the scope being indicated by the following claims.

We claim:

1. A method comprising:
   receiving, at a processor of a robot having a first foot and a second foot, first sensor data from a foot sensor positioned on a top surface of the first foot, the sensor data indicating a force applied to the top surface of the first foot during movement by the robot along a planned gait trajectory, the planned gait trajectory comprising a series of alternating planned footstep locations for the first foot and the second foot;
   determining, by the processor, that the first sensor data is received in response to a first step by the second foot landing on the top surface of the first foot while the first foot is in contact with a ground surface at a first planned footstep location, the first step by the second foot deviating from a second planned footstep location for the second foot;
   determining, by the processor, an updated gait trajectory for movement by the robot while the first foot remains in contact with the ground surface at the first planned footstep location, the updated gait trajectory comprising an updated footstep location for the second foot; and
   causing the robot to move along the updated gait trajectory by swinging the second foot off of the top surface of the first foot and onto the ground surface at the updated footstep location during a second step by the second foot, the updated footstep location positioned closer to the first planned footstep location for the first foot than the second planned footstep location for the second foot.

2. The method of claim 1, further comprising, prior to receiving the first sensor data from the foot sensor, determining that the first foot is in contact with the ground surface at the first planned footstep location.

3. The method of claim 1, wherein determining that the first sensor data is received in response to the first step by the second foot landing on the top surface of the first foot while the first foot is in contact with the ground surface at the first planned footstep location comprises:

prior to receiving the first sensor data from the foot sensor, determining that the first foot is in contact with the ground surface at the first planned footstep location; and in response to receiving the first sensor data from the foot sensor, receiving second sensor data indicating that the bottom surface of the second foot applied the force to the top surface of the first foot.

4. The method of claim 3, wherein the second sensor data is received from a kinematic sensor of the robot.

5. The method of claim 3, wherein the second sensor data is received from one or more proximity sensors of the robot.

6. The method of claim 1, further comprising, in response to receiving the first sensor data from the foot sensor:
   receiving, at the processor, second sensor data indicating a distance between the first foot and the second foot while the foot is contact with the ground surface at the first planned footstep location;
   determining, by the processor, whether the distance between the first foot and the second foot is less than a threshold distance; and
   when the distance between the first foot and the second foot is less than the threshold distance, determining that the first sensor data is received in response to the first step by the second foot landing on the top surface of the first foot.

7. The method of claim 6, wherein the second sensor data is received from a first proximity sensor of the first foot and a second proximity sensor of the second foot.

8. The method of claim 1, wherein the planned gait trajectory comprises a trajectory for a zero moment point of the robot.

9. A robot comprising:
   a first foot having a top surface;
   a second foot;
   a processor;
   a non-transitory computer readable medium; and
   program instructions stored on the non-transitory computer readable medium that, when executed by the processor, cause the robot to perform operations comprising:
      receiving first sensor data from a foot sensor positioned on a top surface of the first foot, the sensor data indicating a force applied to the top surface of the first foot during movement by the robot along a planned gait trajectory, the planned gait trajectory comprising a series of alternating planned footstep locations for the first foot and the second foot;
      determining that the first sensor data is received in response to a first step by the second foot landing on the top surface of the first foot while the first foot is in contact with a ground surface at a first planned footstep location, the first step by the second foot deviating from a second planned footstep location for the second foot;
      determining an updated gait trajectory for movement by the robot while the first foot remains in contact with the ground surface at the first planned footstep location, the updated gait trajectory comprising an updated footstep location for the second foot; and
      causing the robot to move along the updated gait trajectory by swinging the second foot off of the top surface of the first foot and onto the ground surface at the updated footstep location during a second step by the second foot, the updated footstep location positioned closer to the first planned footstep location for the first foot than the second planned footstep location for the second foot.

10. The robot of claim 9, wherein the operations further comprise, prior to receiving the first sensor data from the foot sensor, determining that the first foot is in contact with the ground surface at the first planned footstep location.

11. The robot of claim 9, wherein determining that the first sensor data is received in response to the first step by the second foot landing on the top surface of the first foot while the first foot is in contact with the ground surface at the first planned footstep location comprises:
   prior to receiving the first sensor data from the foot sensor, determining that the first foot is in contact with the ground surface at the first planned footstep location; and
   in response to receiving the first sensor data from the foot sensor, receiving second sensor data indicating that the bottom surface of the second foot applied the force to the top surface of the first foot.

12. The robot of claim 11, wherein the second sensor data is received from a kinematic sensor of the robot.

13. The robot of claim 11, wherein the second sensor data is received from one or more proximity sensors of the robot.

14. The robot of claim 9, wherein the operations further comprise, in response to receiving the first sensor data from the foot sensor:
   receiving second sensor data indicating a distance between the first foot and the second foot while the foot is contact with the ground surface at the first planned footstep location;
   determining whether the distance between the first foot and the second foot is less than a threshold distance; and
   when the distance between the first foot and the second foot is less than the threshold distance, determining that the first sensor data is received in response to the first step by the second foot landing on the top surface of the first foot.

15. The robot of claim 14, wherein the second sensor data is received from a first proximity sensor of the first foot and a second proximity sensor of the second foot.

16. The robot of claim 9, wherein the planned gait trajectory comprises a trajectory for a zero moment point of the robot.

* * * * *